V. G. & E. J. GUSTAFSON.
ASSEMBLING OR DISASSEMBLING DEVICE.
APPLICATION FILED MAR. 3, 1913.

1,144,471.

Patented June 29, 1915.
2 SHEETS—SHEET 1.

Witnesses.
William A. McRobert
Orange R. Smith

Inventors
Victor G. Gustafson
Elmer J. Gustafson
By F. A. Hoover, Atty.

V. G. & E. J. GUSTAFSON.
ASSEMBLING OR DISASSEMBLING DEVICE.
APPLICATION FILED MAR. 3, 1913.

1,144,471.

Patented June 29, 1915.
2 SHEETS—SHEET 2.

Witnesses.
William A. M<sup>c</sup>Robert.
Orange R. Smith.

Inventors
Victor G. Gustafson
Elmer J. Gustafson
By F. A. Hoover, Atty.

UNITED STATES PATENT OFFICE.

VICTOR G. GUSTAFSON AND ELMER J. GUSTAFSON, OF JOLIET, ILLINOIS; SAID ELMER J. GUSTAFSON ASSIGNOR TO SAID VICTOR G. GUSTAFSON.

ASSEMBLING OR DISASSEMBLING DEVICE.

1,144,471.   Specification of Letters Patent.   Patented June 29, 1915.

Application filed March 3, 1913. Serial No. 751,793.

*To all whom it may concern:*

Be it known that we, VICTOR G. GUSTAFSON and ELMER J. GUSTAFSON, citizens of the United States, residing at Joliet, in the county of Will and State of Illinois, have invented an Assembling or Disassembling Device, of which the following is a specification.

Our invention relates to aeroplanes and is a combination of devices to facilitate the assembling or disassembling of aeroplanes having detachable sections and to accomplish the same without the use of bolts or similar fasteners.

The accompanying drawing illustrates our invention and shows its application to an aeroplane.

Figure 1:
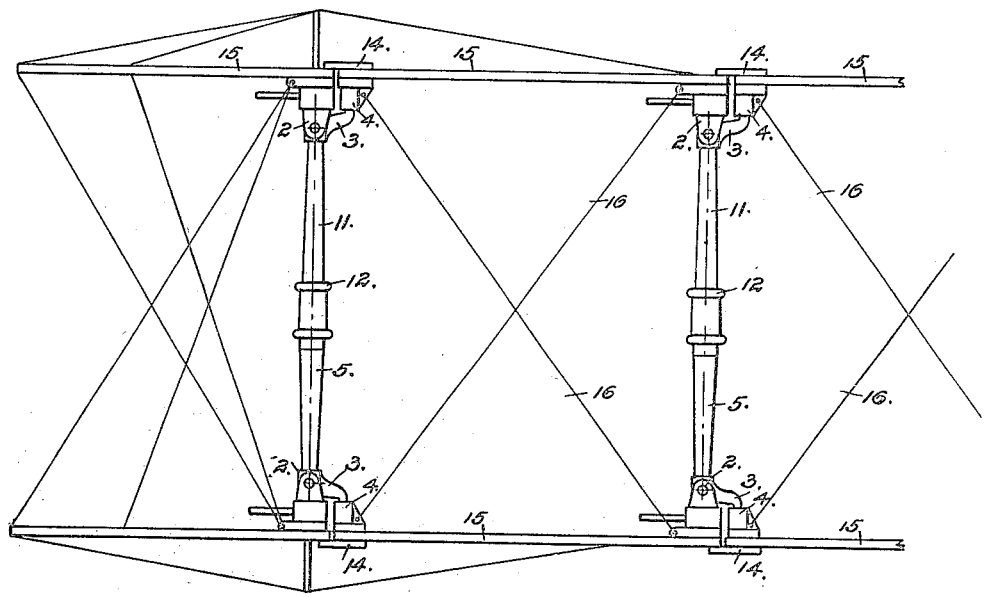
Figure 2:
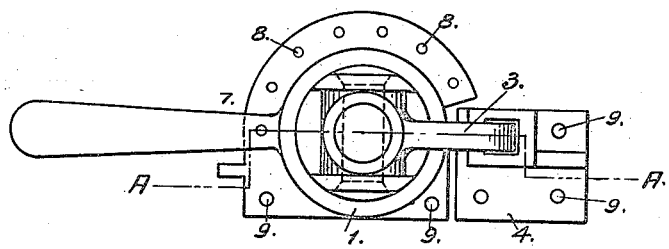
Figure 3:
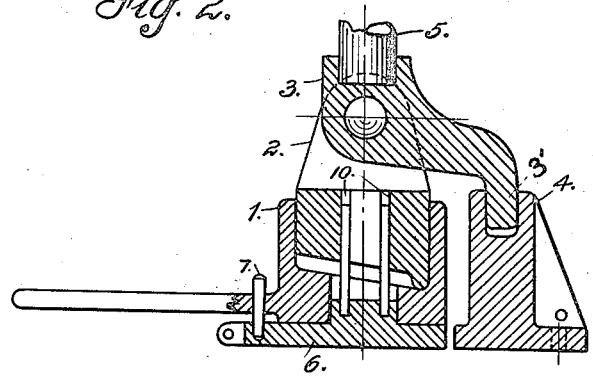
Figure 4:
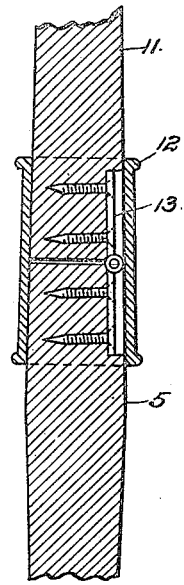
Figure 5:
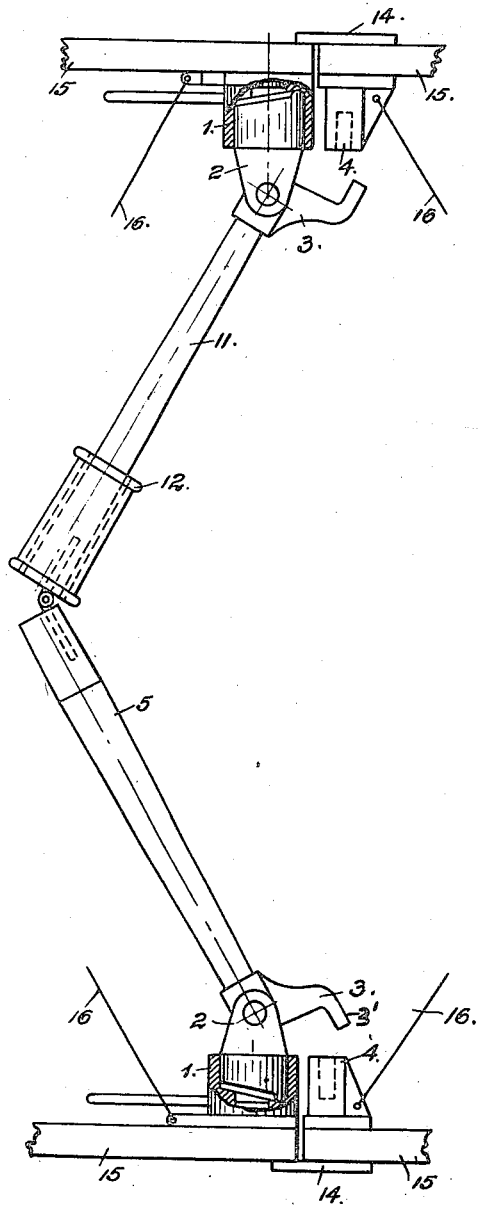
Figure 6:
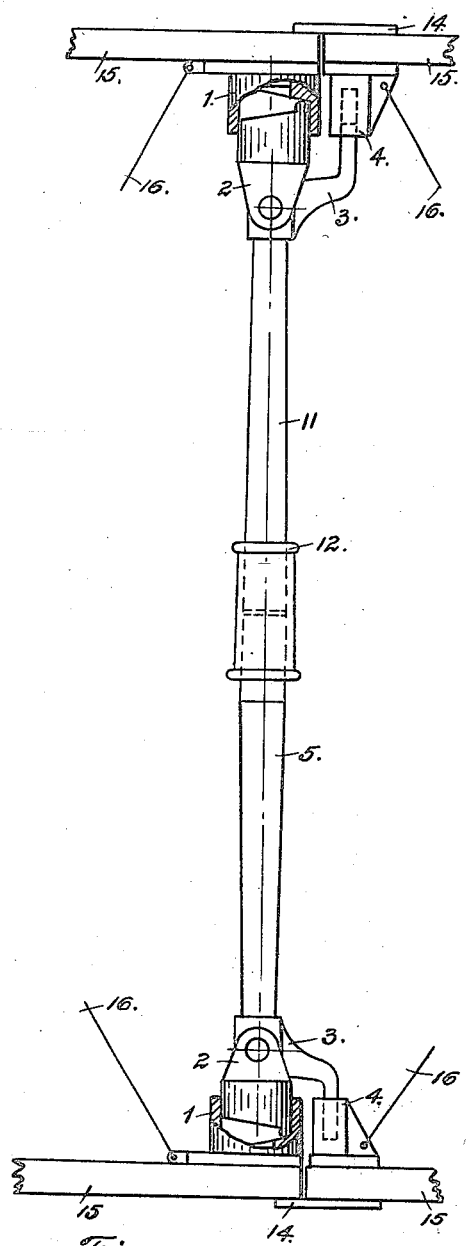

Figure 1 is a side elevation of about one-half of an aeroplane. Fig. 2 is a plan view of a jack. Fig. 3 is a section of a jack. Fig. 4 is a sectional view of a stanchion and the sleeve for sealing the joint. Fig. 5 shows a stanchion in a disassembling position and in combination with jacks that connect it with the planes, and Fig. 6 shows the same in assembled position.

The jacks at the end of each stanchion are identical in shape and operation and serve to connect the stanchions to the upper and lower plane sections 15. Turning the sleeve 1 on the lower part of the support 2 raises or lowers the support, and consequently increases or decreases the space between the upper and lower sections 15, and thus slackens or tightens the guy wires 16. The sections 5 are the lower parts and the sections 11 the upper parts of the stanchions. The support 3 is also a cap for the end of a stanchion and is the means for pivoting a section of a stanchion on the support 2, and engaging the socket 4 with its integral lug. In assembling, the ends of sections 15 are moved between the cleats 14, and the alining of the stanchion moves the lug of support 3 into the socket 4, and thus locks the plane sections together. The base 6 of the jack, contains the dowel pins 10 which prevent the support 2 from turning when the sleeve 1 is turned. The pins 7 and holes 8 are for locking sleeve 1. The bolt holes 9 are means to secure the bases 6 to the plane sections 15. The sections 5 and 11 are connected by the hinge 13. The sleeve 12 is a sealing means when sections 5 and 11 are in alinement and is slidable over the joint. It can be seen that by manipulating a stanchion as shown in Fig. 5, one section of the aeroplane can be detached from another, also, that the guy wires can be relaxed with the jacks and removed, and that an important function of the jacks is to key the aeroplane up to the desired tension and rigidity. No particular form of jack is required, and we claim no novelty in the jack illustrated, but only for the combination of two jacks with a jointed stanchion. Figs. 2 and 3 illustrate the operations of each jack, support or cap 3 and socket 4, whether used above or below.

What we claim is—

1. In an aeroplane composed of several detachable sections, jointed stanchions; twin jacks, one secured to the inner side of a plane section above, at the edge thereof, and the other secured in the same relative position to the plane section below; a socket secured to an adjoining edge of an adjoining plane section, opposite to each of said jacks; a supporting cap secured on each end of each of said stanchions and pivotable in the projecting end of a jack; a lug, integral with each of said supporting caps, and in a position to be engaged by a socket, when the two sections of the stanchion are alined, or to be withdrawn therefrom, when said sections are moved to an angle with each other.

2. In an aeroplane, stanchions, composed of two sections each, hingeable on each other; means to pivotally connect each end of each of said stanchions to one of the planes on the inner side thereof; a lug connected to each of said pivoting means in such a position as to be engaged by a socket adjacently situated, so that hinging the sections of said stanchion to a certain angle will withdraw said lug from said socket, and alining said sections will replace it in said socket; means for sealing the hinging joint of each of said stanchions, substantially as described.

3. In a flying machine comprising a sectional upper plane, a sectional lower plane, means for holding said planes apart and guy wires uniting the upper and lower sectional members of each section, said means comprising hinged posts, adjustable means for holding said posts rigid and means for removably securing said posts to upper and lower sections.

In testimony that we claim the foregoing as our own, we have hereunto affixed our signatures in the presence of two witnesses.

VICTOR G. GUSTAFSON.
ELMER J. GUSTAFSON.

Witnesses:
WILLIAM A. McROBERT,
ORANGE R. SMITH.